P. E. DAUBENSPECK.
TIRE CHAIN.
APPLICATION FILED MAY 15, 1919.
1,341,301.
Patented May 25, 1920.
2 SHEETS—SHEET 2.
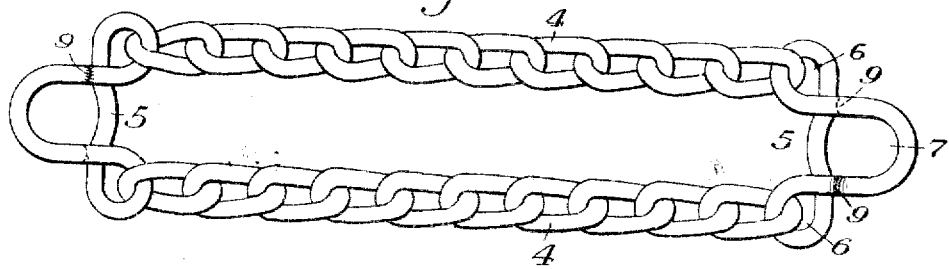
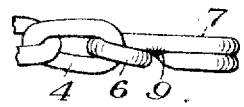
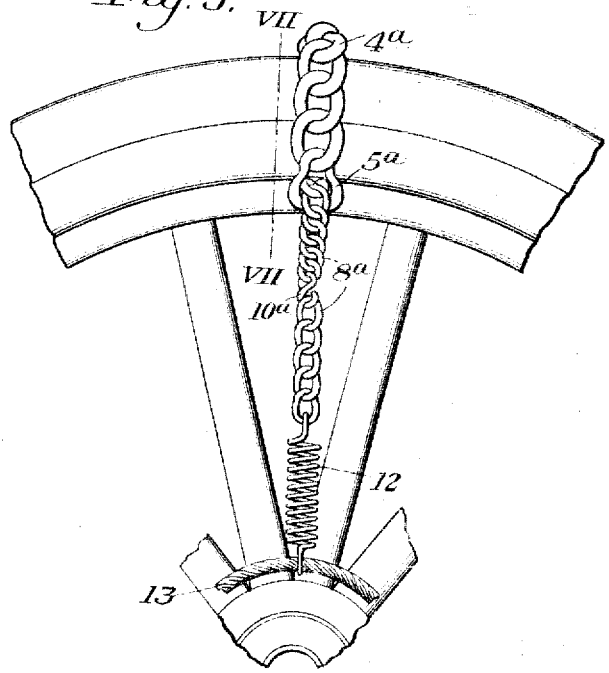
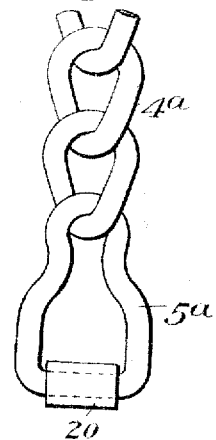
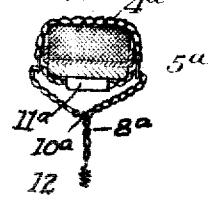
WITNESS
R A Balderson
Francis Trainor
INVENTOR
P. E. Daubenspeck
by Bakewell, Byrnes Parmelee
Attys

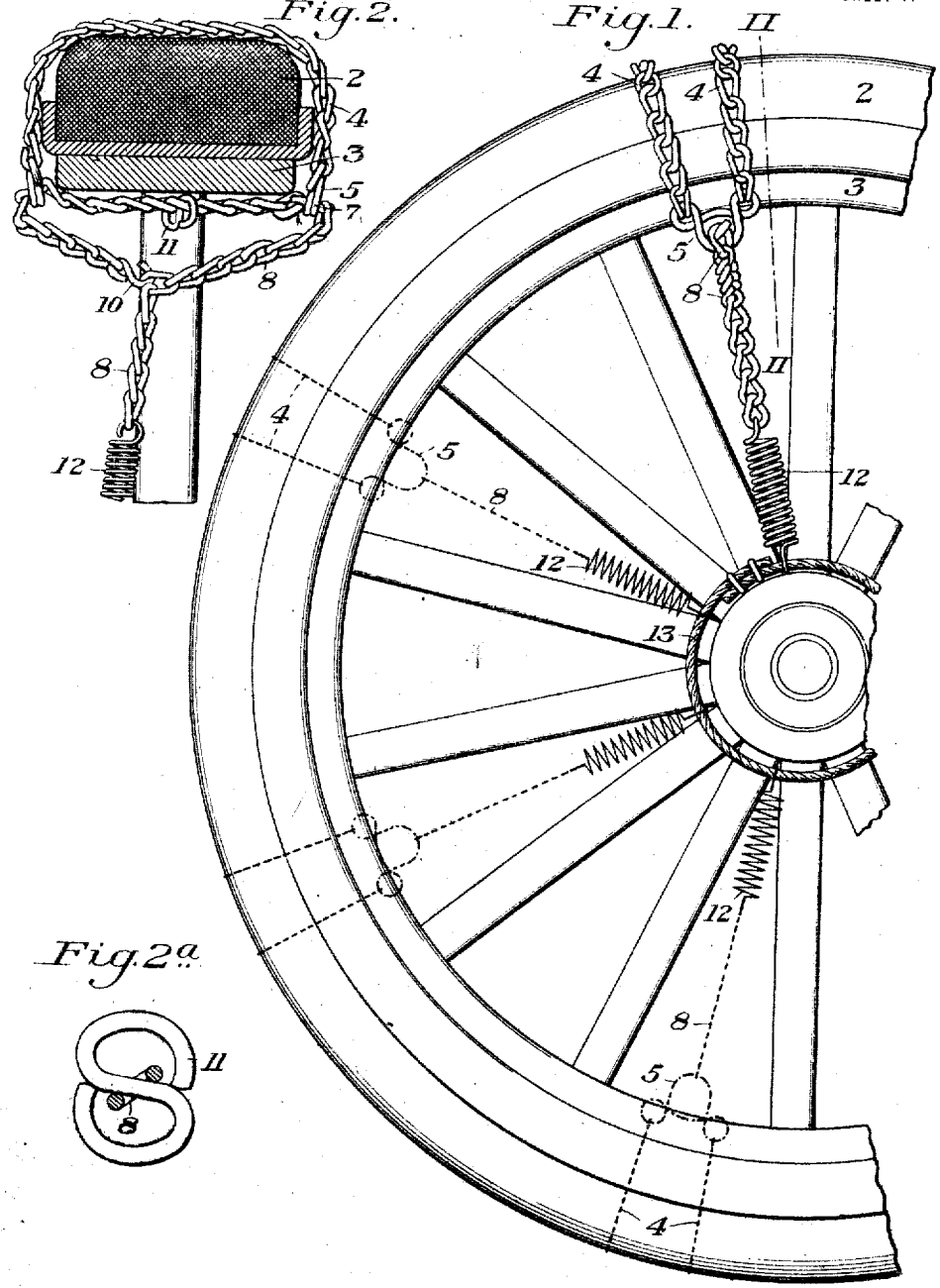

UNITED STATES PATENT OFFICE.

PETER E. DAUBENSPECK, OF BUTLER, PENNSYLVANIA.

TIRE-CHAIN.

1,341,301.     Specification of Letters Patent.     Patented May 25, 1920.

Application filed May 15, 1919. Serial No. 297,361.

*To all whom it may concern:*

Be it known that I, PETER E. DAUBENSPECK, a citizen of the United States, residing at Butler, in the county of Butler and State of Pennsylvania, have invented a new and useful Improvement in Tire-Chains, of which the following is a full, clear, and exact description, reference being had to the accompanying drawings, forming part of this specification, in which:

Figure 1 is a side elevation of a portion of a wheel to which I have shown the of the skid chains attached, and several others shown in diagram.

Fig. 2 is a sectional view through the wheel on the line II—II of Fig. 1.

Fig. 2ª is a detail view illustrating one form of securing member for the traction chain.

Fig. 3 is a plan view of the traction chain shown in Figs. 1 and 2.

Fig. 4 is a side elevation of one portion of the chain shown in Fig. 3.

Fig. 5 is a view similar to Fig. 1 showing a modified form of traction chain.

Fig. 6 is a side elevation of a portion of the traction chain shown in Fig. 5, and Fig. 7 is a sectional view on the line VII—VII of Fig. 5.

This invention relates to an improvement in tire chains, and is designed to provide an efficient device of this character, which can readily be attached and removed and which is so arranged that the parts which are subjected to the greatest wear can readily be replaced. Another object of my invention is to provide a device of this character having two traction chains connected to each other and which are oppositely disposed, with relation to each other so that there is no tendency for the device to creep laterally or transversely with relation to the tire.

A further object of my invention is to so connect the traction chains to the securing chains that the traction chains will be maintained in their proper relation to the securing chains when removed from the wheel.

A still further object of my invention is to provide a non-skid device in which the traction chain or chains have a spring connection with the wheel and which is so arranged that such connection is relieved of a considerable portion of the weight of the traction chain or chains.

The precise nature of my invention will be best understood by reference to the accompanying drawings which will now be described, it being premised, however, that various changes may be made in the details of construction and the general arrangement of the parts, without departing from the spirit and scope of my invention as defined in the appended claims.

In these drawings the reference character 2 designates the tire of a wheel, and 3 the felly thereof. In the drawings I have shown a cushion tire, although it will readily be appreciated that the device may be attached to a pneumatic tired wheel. The anti-skid device comprises traction chains 4, the ends of which are secured to a link member 5, and as shown in Fig. 3 as well as Fig. 1, the chains 4 are twisted reversely with relation to each other. The link member 5 is formed of a single piece of wire bent upon itself to form eyes 6 to which the end links of the chains 4 are attached and the eye 7 for the reception of a securing chain 8. The ends of the wire from which the link 5 is made, are bent upon each other, as clearly shown in Figs. 3 and 4 and are spotwelded at the points 9. One end of the securing chain 8 is passed through the eye 7 of the link 5, and the end thereof is provided with a hook member 10 which is adapted to be connected to any of the intermediate links, as shown in Fig. 2, in order to draw the traction chain about the tire 2. Connected to one of the links of the securing chain 8 and between the links 5 when the device is in position, is an S-shaped locking member 11 which is arranged to prevent the end of the chain 8 from passing through one of the links and prevent the traction chains from becoming disengaged from the securing chain. The other end of the securing chain is connected to one end of a spring member 12 which is in turn connected to a flexible member 13 which is adapted to surround the hub of the wheel.

It will be noted that the traction chains are of sufficient length to extend across the tread and around the sides of the tread and felly with their ends terminating adjacent to the inner edges of the felly. In this manner the securing chains are adapted to rest against the inner surface of the felly, thus taking approximately one-half of the weight of the traction chains and relieving the springs 12 to this extent. This enables lighter springs to be employed and saves wear and breakage of the springs.

When it is desired to remove the device from the wheel it is only necessary to disconnect the hook members 10 from the links of the securing chain and draw the short end of the securing chain through one of the eyes of the link 5 on the traction chain, and then remove the device from the wheel. The S-shaped locking member 11 will prevent the end of the securing chain from passing through the right end link 5 as seen in Fig. 2. By this arrangement it will readily be seen that the chain parts are always in their proper positions to be applied to the wheel; and if the hook member 10 on any one of the chains should be disengaged from its link the locking member 11 will prevent the traction chain from slipping off the end of the securing chain.

In Figs. 5, 6 and 7 I have shown a device similar to that shown in the other figures with the exception that there is only one traction chain 4ª which is provided with link members 5ª at each end for the reception of the securing chain 8ª. In this device the locking member 11ª consists of a tubular member of rubber or any other material which is slipped over the chain and will prevent it from passing through the eyes of one of the links 5ª. In this construction I have shown a roller 20 on each of the link members 5ª about which the securing chains pass.

The advantages of my invention result from the provision of a traction or non-skid device in which the traction chains are slidably connected to the securing chain in such a manner that the securing chain may be adjusted to draw the traction chains taut about the wheel, together with a spring member for holding the traction chain in tension. Another advantage results from the provision of a traction chain having two chain members which are oppositely disposed with relation to each other, so that one will oppose the other and prevent creeping. A further advantage results from the provision of a locking member on the securing chain which will permit a free movement of the securing chain with relation to the traction chain for adjustment, but will prevent one end of the traction chain from slipping off the securing chain.

A still further advantage of my invention results from the arrangement whereby the wheel felly is caused to carry a considerable part of the weight of the traction chain or chains.

I claim:

1. A device of the character described, comprising a traction chain adapted to pass around the tire of a wheel, a securing chain arranged to pass through links on both ends of the traction chain, means for connecting one end of the securing chain to an intermediate portion thereof, and means for securing the other end of the securing chain to the wheel.

2. A device of the character described, comprising a traction chain adapted to pass around the tire of a wheel, a securing chain arranged to pass through links on both ends of the traction chain, means for connecting one end of the securing chain to an intermediate portion thereof, a spring member connected to the other end of the securing chain, and means for connecting the spring to a wheel.

3. A device of the character described, comprising a traction chain adapted to pass around the tire of a wheel, a securing chain arranged to pass through links on both ends of the traction chain, means for connecting one end of the securing chain to an intermediate portion thereof, a locking member on the securing chain for preventing one end of the traction chain from slipping off of the securing chain, and means for securing the other end of the securing chain to a wheel.

4. The combination of a wheel and a plurality of non-skid devices, each comprising a traction chain, of a securing chain passing through the ends of the traction chain, means on each securing chain for connecting one end thereof to an intermediate portion of the securing chain, and a resilient connection between the other end of the securing chain and the wheel.

5. A device of the character described, comprising a plurality of non-skid devices each comprising a traction chain, the respective ends of said chains being secured to a common link member, a securing chain passing through said link members, means for connecting one end of the securing chain to an intermediate portion thereof, and means for connecting the opposite end of the securing chain to the wheel, substantially as described.

6. A device of the character described, comprising a plurality of non-skid devices each comprising a traction chain, the respective ends of said chains being secured to a common link member, a securing chain passing through said link members, means for connecting one end of the securing chain to an intermediate portion thereof, and a resilient connection between the opposite end of the securing chain and the wheel, substantially as described.

7. A device of the character described, comprising a plurality of pairs of oppositely disposed traction chains, the respective ends of said chains being secured to a common link member, a securing chain passing through said link members, means for connecting one end of the securing chain to an intermediate portion thereof, and means for connecting the opposite end of the securing chain to the wheel, substantially as described.

8. A device of the character described, comprising a traction chain adapted to pass around the tire or wheel, a securing chain arranged to pass through links on both ends of the traction chain, means for preventing disengagement of the traction chain from the securing chain, means for connecting one end of the securing chain to an intermediate portion thereof, and means for securing the other end of the securing chain to a wheel, substantially as described.

9. A device of the character described, comprising a traction chain adapted to pass around the tire or wheel, a securing chain arranged to pass through links on both ends of the traction chain, means for connecting one end of the securing chain to an intermediate portion thereof, and resilient means for securing the other end of the securing chain to a wheel, substantially as described.

10. A non-skid device, comprising a traction chain, a securing chain arranged to pass through links on both ends of the traction chain, and a spring device for attaching the securing chain to a wheel, substantially as described.

11. A non-skid device, comprising a traction chain, a securing chain arranged to pass through links on both ends of the traction chain, and a spring device for attaching the securing chain to a wheel, said securing chain being arranged to rest on the inner side of the wheel felly and thereby relieve the spring device of a portion of the weight of the traction chain, substantially as described.

In testimony whereof I have hereunto set my hand.

PETER E. DAUBENSPECK.